Oct. 12, 1965  H. HEIMBERGER  3,211,047
POLARIZATION TYPE ANTI-DAZZLE DEVICE FOR MOTOR VEHICLES
Filed Aug. 20, 1962
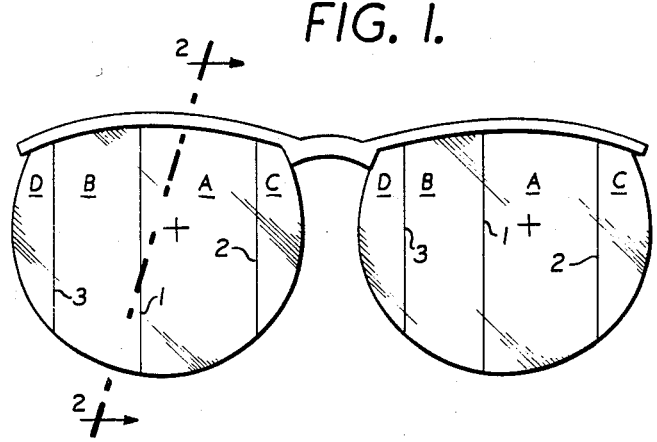
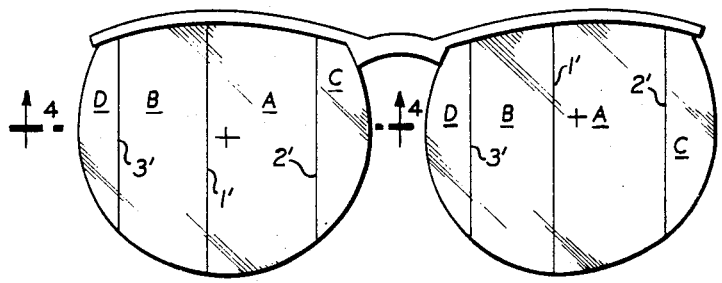
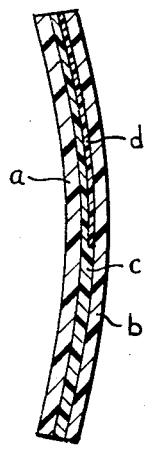
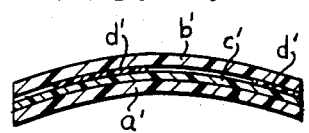
INVENTOR
HERMANN HEIMBERGER
BY
ATTORNEY.

United States Patent Office 3,211,047
Patented Oct. 12, 1965

3,211,047
POLARIZATION TYPE ANTI-DAZZLE DEVICE FOR MOTOR VEHICLES
Hermann Heimberger, Gartenstrasse 10, Reutlingen, Germany
Filed Aug. 20, 1962, Ser. No. 217,944
Claims priority, application Germany, Mar. 3, 1959, H 35,780
5 Claims. (Cl. 88—1)

The present invention relates to an anti-dazzle device for automotive vehicles by means of the use of polarization filters.

This is a continuation-in-part application of the co-pending application Ser. No. 12,081, filed Mar. 1, 1960 (now abandoned).

Different proposals have been made before which aim to remove the danger of a dazzle effect of oncoming motor vehicles by using the polarization characteristics of the light.

The first proposals went in the direction to polarize the light emerging from headlight beams of all motor vehicles in a predetermined direction, either horizontally or obliquely, by means of polarization filters built into the headlights and to equip each automotive vehicle with a polarization filter serving as an analyzer and disposed on or adjacent to the windshield, the polarization filter having a plane of vibration perpendicular to that of the light of the headlight beams. The polarization filter is either rigidly or swingably secured to or adjacent the windshield, in the manner of a sun visor, or it is applied to particular goggles to be worn by the driver.

This rather sound proposal could not be put to practice yet, however, because it would require legal enforcement which would provide by law that all drivers have to polarize their headlight beams in compliance with the law, and to equip themselves or their motor vehicles with polarization filters serving as analyzers.

In addition, appreciable technical difficulties are encountered in connection with this proposal, since in accordance with the status of the art in this particular field, the polarization filters are quickly destroyed at the high temperatures prevailing in the headlights, aside from the fact that the degree of polarization of the artificial polarization films is incomplete. A further difficulty presents itself also in the comparatively high price of the polarization films.

It is apparently for this reason, that it has been proposed already to provide the polarizer and the analyzer in the same vehicle (German Patent No. 825,452 to Haase), which arrangement brings about the advantage that in order to avoid a dazzling effect, it is by no means necessary that the headlight beams of oncoming motor vehicles are polarized in a predetermined direction. In order to achieve this end, for instance, a vertically polarizing polarization filter is provided on the windshield, and the driver is equipped with particular polarization goggles, the lenses of which are divided into individual fields, at least one of which is polarized, for instance, horizontally and, thereby, cancels out more or less completely the light of oncoming vehicles vertically polarized by the windshield polarizer in the manner of an analyzer. The size and arrangement of these horizontally polarizing lens fields are chosen in this known arrangement such, that the driver, upon slight inclination or slight turning of his head, is put into the position that the disturbing light of headlight beams of oncoming vehicles is correspondingly weakened or cancelled out by the horizontally polarizing part of his goggles, while he can observe the road outside of his windshield polarizer lit by his own non-polarized headlights undisturbed through all parts of his goggles.

In order to bring about an adaptation of the eye unavoidably balanced for physiological reasons, in connection with goggles divided into individual fields, also those parts of the goggles, which permit an undisturbed view of the road to the driver, must be covered, with a polarization film polarizing parallel to the polarizer, thus with a vertically polarizing polarization film. This is rather expensive in its manufacture. Furthermore, however, it was so far impossible to set side by side the two polarization films polarizing perpendicularly towards each other without a joint.

In the use of polarized light for the achievement of an effective anti-dazzle protection, it is necessary to take into consideration to an appreciable degree the physiological characteristics of the human eye, whereby use is made of a discovered novel physical phenomenon discovered by the inventor, which brings about an effect, which can be described as follows:

It is known that the light penetration of two colored films disposed in series one behind the other amounts to about one half of the light penetration of a single one of these films. This effect is not changed, if one of the two colored films disposed in series one behind the other is linearly or circularly polarized.

This known effect is, however, basically changed if:

(1) The viewing color of the polarizing film is arranged within the green-yellow range of the spectrum, thus within the range of the greatest eye sensitivity, and if (2) both films are polarization films, preferably linearly polarizing films.

If two such polarizing films are disposed in series one behind the other with a parallel polarizing direction, the light penetration through both these films is more predominantly yellowish, giving the physiological visual effect of a lighter viewing field.

If two such polarization films are arranged in series one behind the other, having a direction of polarization perpendicular towards each other, a color transformation of the passing light into a dark green-blue takes place with a wave-length range of about 470 to 480 m$\mu$, in which the eye sensitivity amounts only to a small proportion of its maximum value.

It is, therefore, one object of the present invention to provide an anti-dazzle device for automotive vehicles, which comprises polarization films serving as a polarizer and as an analyzer, respectively, with a predetermined, not necessarily equal self-coloring, which are adjusted towards each other such, that the viewing color of both polarization films in case of a parallel oscillation direction of the polarizer and of the analyzer, namely, when a possibly great light effect is desired, is disposed within the spectral range of great eye sensitivity, thus, for instance between 570 and 600 m$\mu$, while upon crossing the direction of oscillations of the polarizer and of the analyzer, thus, when the oncoming light is to be weakened as much as possible, a color transformation is brought about in a spectral range, in which the eye sensitivity is of a value amounting to a portion only of the maximum value.

It is another object of the present invention to provide an anti-dazzle device for automotive vehicles, wherein under consideration of the physiological reaction of the human eye, for instance also in relation to the adaptability, the occurrence of after-images and the like, the color transformation, in case of crossed polarization films, is changed into the indigo-blue and blue-green range of the spectrum with a wave length of about 480 to 470 m$\mu$, where the eye sensitivity still amounts to about 10–5% of the maximum value.

It has been found advantageous to choose, upon use of the same polarization film for the polarizer and for the analyzer, the viewing color of such film, preferably, at about 530 and 560 mμ, which corresponds with a green-yellow color tone, where the eye sensitivity amounts to more than 85% of the maximum value.

It is still another object of the present invention to provide an anti-dazzle device for automotive vehicles, which includes goggles worn by the driver of the vehicle, and wherein the lenses of the goggles are equipped at its front and at its rear with an optically neutral covering plate, preferably made of artificial resin, as for instance polyvinyl chloride.

It is yet another object of the present invention to provide an anti-dazzle device for automotive vehicles, which includes goggles worn by the driver of the vehicle and the lenses of the goggles have covering plates, and between the covering plates is disposed a vertically polarizing polarization film with a green color tone, having, preferably, a wave-length of about 530 to 560 mμ.

It is another object of the present invention to provide an anti-dazzle device for automotive vehicles, which includes goggles worn by the driver and wherein, in accordance with one embodiment of the present invention, those field portions of the lenses of the goggles, through which a dazzling of the driver can be avoided, for instance by a slight turning or inclination of the head of the driver, are covered with a layer of a suitable thick, colorless bi-refringent film of artificial material.

Upon "proper" selection of the spectral penetration range of the polarization films and the thickness of the bi-refringent, colorless film of artificial material, it is possible to achieve, that within the range of the latter the light penetration is of an equal value between the polarizer and the crossed analyzer, in the same manner as if the light would pass through two parallel polarization films disposed in series one behind the other without an intermediate bi-refringent film of artificial material, because the crossed analyzer becomes a parallel vibrating polarizer by means of the colorless film of artificial material due to the rotation of the polarized light for 90° upon suitable axis position of the film of artificial material and vice versa.

With these and other objects in view, which will become apparent in the following detailed description, the present invention will be clearly understood in connection with the accompanying drawing, in which:

FIGURE 1 is a front elevation of one embodiment of the present invention showing the polarization goggles;

FIG. 2 is a section along the lines 2—2 of FIG. 1;

FIG. 3 is a front elevation of another embodiment of the polarization goggles; and FIG. 4 is a section along the lines 4—4 of FIG. 3.

Referring now to FIGS. 1 and 2 of the drawing, disclosing the first embodiment, the lenses of the goggles are covered with an inner covering plate $a$ and an outer covering plate $b$ and a vertically polarizing, green-yellow colored polarization film $c$ is disposed between the covering plates $a$ and $b$. Finally, a portion of the polarization film $c$ is covered with a bi-refringent film of artificial, preferably glass-clear material disposed with its main axis at 45° to the direction of vibration of the polarization film $c$ and consisting of, for instance, polyvinyl alcohol, cellulose acetate or the like.

The polarization goggles, designed in the manner set forth above, appear in non-polarized light equally yellow-green, however, green-blue behind the vertically polarizing polarizer in those fields, which are covered by the bi-refringent film, yet yellow in those fields which are not covered by the bi-refringent film.

It is possible to obtain a complete anti-dazzle protection even upon use of insufficiently polarizing and correspondingly cheaper polarization films, by the use of such polarization goggles.

Referring now again to the drawings, and in particular to FIGS. 3 and 4, the lenses of the goggles are equipped again with an inner covering plate $a'$ and an outer covering plate $b'$ and a polarization film $c'$ is disposed between the covering plates $a'$ and $b'$. A bi-refringent film $d'$ covers predetermined fields of the lenses, yet the fields covered by the bi-refringent film $d'$ are different in this second embodiment compared with the first embodiment, as will be set forth below.

The polarization goggles, designed in accordance with the present invention, have, seen from the wearer of the goggles, the appearance as shown in FIGS. 1 and 3 of the drawings, and have also the same relative position of the vertically and horizontally polarizing fields A, B, C and D. The difference between the two embodiments shown in FIGS. 1 and 3 of the drawings resides in the arrangement of the bi-refringent layer.

In the embodiment disclosed in FIGS. 1 and 2, the polarization film $c$, covering the entire lenses of the goggles, polarizes in horizontal direction and the fields A and D only are covered by the bi-refringent film $d$, so that the fields A and D are polarized in vertical direction.

The same result can be obtained with the second embodiment disclosed in FIGS. 3 and 4 of the drawings, in which the polarization film $c'$, covering again the entire lenses of the goggles, polarizes vertically and the fields B and C only are covered with the bi-refringent film $d'$.

In both embodiments, as shown in FIGS. 1 and 3, the lenses are divided into four separate fields A, B, C and D, as set forth above.

As shown in the drawings, to the right of the preferably vertical dividing line 1 the vertically polarizing field A is disposed, which gives practically an undiminished view having a central viewing point marked by a cross and to the left of the dividing line 1 is disposed the horizontally polarizing field B. By a slight turning of the head or by inclination of the head to the right, the disturbing headlight beam vertically polarized by the windshield polarizer of an oncoming vehicle can be brought within the range of the horizontally polarizing field B and, thereby, be extinguished or at least be made less effective. The same results can be obtained with the goggles shown in FIG. 3.

In order to avoid a dazzle effect by the headlight beams of the following vehicles on the rearview mirror, which is covered with a vertically polarizing film, in accordance with the present invention, the extreme right field C of the goggles which is separated from the field A by the, preferably, vertical dividing line 2 is horizontally polarized either by the polarization film $c$ or by the mentioned bi-refrigent film $d'$, while the field D of the lenses of the goggles is disposed at the extreme left thereof next to the field B, so that vehicles coming from the left or obstacles at the left side of the road can be seen without any difficulty, since the field D is vertically polarized in the same manner as the field A and by the same means.

While thus in both embodiments the lenses of the goggles are divided into the fields D, B, A and C, seen from left to right, in the first embodiment, the fields D and A are covered with the bi-refringent film $d$, while in the second embodiment the fields B and C are covered with the bi-refringent film $d'$, both embodiments bringing about the same anti-dazzling effect.

It is also possible to arrange the dividing line between the respective fields of the lenses in a direction different than vertical. An optically non-disturbing arrangement of sharply divided fields having different vibration planes of the polarized light and disposed adjacent each other can be obtained without joint between adjacent fields by the application of the mentioned bi-refringent film of artificial material.

While I have disclosed two embodiments of the present invention, it is to be understood that these embodiments are given by example only and not in a limiting sense, the scope of the present invention being determined by the objects and the claims.

I claim:

1. An anti-dazzle device for motor vehicles including a windshield, a visor and a rear view mirror, constituting first elements and goggles, adapted to be worn by the driver, constituting a second element, comprising
  a first polarization filter disposed on one of said first elements and serving as a polarizer to polarize the light passing therethrough in one direction of oscillation,
  a second polarization filter disposed on said second element and serving as an analyser for the polarized light incident on said second element,
  said polarization filters having green-yellow colors such that when the directions of polarization of the polarizer and of the analyser are the same, the wave lengths of the light passed through the eyes of the driver lie approximately between 515 and 600 m$\mu$, corresponding to a relative sensitivity of more than approximately 85% of the maximum value, and when the directions of polarization of the polarizer and the analyser are at right angles to each other, the wave lengths of the light passed through the eyes of the driver lie approximately between 470 and 480 m$\mu$ corresponding to a contrast sensitivity of approximately 5 to 10% of the maximum value, and
  said goggles comprise a polarizing film extending over the whole of said goggles, and
  a doubly-refracting colorless film disposed in front of a portion of the polarizing film, said polarizing film being adapted to polarize light in a direction at right angles to the direction of polarization of said first polarization filter, and
  said doubly-refracting foil being disposed with its optical axis inclined at an angle of 45° to the direction of polarization of the polarizing film.

2. The anti-dazzle device, as set forth in claim 1, wherein
  said polarizing film and said doubly-refracting film are disposed between optically neutral plates.

3. The anti-dazzle device, as set forth in claim 1, wherein
  the whole of each of said goggles has a uniform light transparency color in unpolarized light.

4. The anti-dazzle device, as set forth in claim 1, wherein
  each of said goggles has four fields divided by vertical dividing lines, and
  said fields polarize alternately vertically and horizontally.

5. The anti-dazzle device, as set forth in claim 1, wherein
  the central viewing portion of each of said goggles is disposed in a field which polarizes in the same direction as said first polarization filter.

References Cited by the Examiner

UNITED STATES PATENTS

| | | | |
|---|---|---|---|
| 2,120,365 | 6/38 | Kriebel | 88—65 X |
| 2,298,058 | 10/42 | Land | 88—65 |
| 2,334,446 | 11/43 | Serrell | 88—65 X |
| 2,367,096 | 1/45 | Chubb | 88—65 |

FOREIGN PATENTS

| | | |
|---|---|---|
| 683,933 | 11/39 | Germany. |
| 825,452 | 12/51 | Germany. |
| 488,958 | 7/38 | Great Britain. |

DAVID H. RUBIN, *Primary Examiner.*